United States Patent

Neumaier et al.

[11] Patent Number: 5,828,025
[45] Date of Patent: Oct. 27, 1998

[54] DISCONNECTING/GROUNDING SWITCH FOR METAL-ENCAPSULATED, GAS-INSULATED HIGH-VOLTAGE SWITCHGEAR

[75] Inventors: Heinrich Neumaier, Hausach; Volker Thomas, Hanau, both of Germany

[73] Assignee: ABB Patent GmbH, Mannheim, Germany

[21] Appl. No.: 910,650

[22] Filed: Aug. 13, 1997

[30] Foreign Application Priority Data

Aug. 13, 1996 [DE] Germany .................. 196 32 574.9

[51] Int. Cl.$^6$ .................................................. H01H 33/00
[52] U.S. Cl. ................................................ 218/79; 218/80
[58] Field of Search ................. 218/1, 8, 11, 12, 218/13, 43, 45, 48, 49, 50, 55, 65, 67, 68, 74, 75, 79, 80, 100, 107, 108

[56] References Cited

U.S. PATENT DOCUMENTS

| | | | |
|---|---|---|---|
| 3,553,397 | 1/1971 | Schmitz | 200/48 |
| 3,599,041 | 8/1971 | Boersma et al. | 317/18 R |
| 5,578,805 | 11/1996 | Berger et al. | 218/43 |
| 5,625,179 | 4/1997 | Bleiker et al. | 218/80 |
| 5,721,412 | 2/1998 | Schifko et al. | 218/43 |

*Primary Examiner*—Michael A. Friedhofer
*Attorney, Agent, or Firm*—Herbert L. Lerner; Laurence A. Greenberg

[57] ABSTRACT

A disconnecting/grounding switch for metal-encapsulated, gas-insulated high-voltage switchgear. A first fixed contact is connected to a first inner conductor. A second contact is connected to an inner conductor running at right angles to the first inner conductor. A moving contact member connects the two fixed contacts in one position and connects the second fixed contact with a fixed grounding contact in a second position. The moving contact member is a thrust contact whose path of motion runs at an angle to the first and second inner conductors and which can move linearly in a contact housing that forms the second contact. The two fixed contacts and the grounding contact are in a line. In a first position, the moving contact member can connect the first fixed contact to the contact housing; in a second position, it is located inside the contact housing, and in a third position, it connects the contact housing to the grounding contact.

11 Claims, 6 Drawing Sheets

DISCONNECTING/GROUNDING SWITCH FOR METAL-ENCAPSULATED, GAS-INSULATED HIGH-VOLTAGE SWITCHGEAR

BACKGROUND OF THE INVENTION

1. Field of the Invention

The invention relates to an disconnecting/grounding switch for metal-encapsulated, gas-insulated high-voltage switchgear with a first fixed contact which is connected to a first inner conductor, with a second fixed contact which is connected to a second inner conductor running at right angles to the first, with a fixed grounding contact and with a moving contact member which in one position connects the two fixed contacts and in a second position connects the second fixed contact to the grounding contact.

2. Description of the Related Art

Disconnecting switches or insulator switches, which can also carry out grounding, have become known in large numbers. Many have an isolating blade which is mounted such that it can rotate and can be pivoted into an insulating position, into a connected position and into an grounding position.

Disconnecting switches in which a pusher or thrust movement of a moving contact member is used for connection and disconnection have additional grounding contacts in the form of grounding blades, with which grounding can be achieved. The switches are relatively complicated and rather expensive.

SUMMARY OF THE INVENTION

It is accordingly an object of the invention to provide an disconnecting/grounding switch for a metal-encapsulated, gas-insulated high frequency switch gear, which overcomes the above-mentioned disadvantages of the heretofore-known devices and methods of this general type and which allows for a structurally simple solution.

With the foregoing and other objects in view there is provided, in accordance with the invention, a disconnecting/grounding switch for metal-encapsulated, gas-insulated high-voltage switchgear, comprising:

- a first inner conductor and a first fixed contact connected to the first inner conductor; a second inner conductor extending perpendicularly to the first inner conductor and a second fixed contact connected to the second inner conductor;
- a fixed grounding contact; a moving contact member in the form of a thrust contact movable between a first position in which the moving contact member connects the first and second fixed contacts and a second position in which the moving contact member connects the second fixed contact to the grounding contact;
- a contact housing forming the second fixed contact, the moving contact member being disposed in the contact housing and being linearly movable therein along a movement path extending at a given angle relative to the first and second inner conductors;
- each of the fixed contacts and the grounding contact having a center axis, wherein the center axes of the fixed contacts and of the grounding contact, and the movement path of the moving contact member are aligned with one another.

In accordance with an added feature of the invention, the thrust contact is formed with a toothed segment, and the assembly includes a gear train meshingly driving the thrust contact. The gear train comprising a pinion disposed in the contact housing which meshes with the toothed segment on the thrust contact.

In accordance with an additional feature of the invention, the first fixed contact, the second fixed contact, the contact housing, and the moving contact member are disposed within a sealed encapsulation, and including a threaded spindle driving the moving contact member, and a drive disposed outside the sealed encapsulation rotatingly driving the threaded spindle.

In accordance with another feature of the invention, the moving contact member is hollow defining an interior space, and including a drive element disposed in the interior space, the drive element being formed with an internal thread in which the threaded spindle engages, the moving contact member being prevented from turning when the threaded spindle is turned.

In accordance with a further feature of the invention, the metal encapsulation has an opening formed therein, and including a cylindrical section having an external base, a drive spindle passing through the external base and being connected to the threaded spindle via an insulating bolt, and the cylindrical section carrying the grounding contact.

In accordance with again an added feature of the invention, the fixed contact and the grounding contact are formed with a cylindrical wall into which the moving contact member is inserted.

In accordance with again an additional feature of the invention, there is provided a plurality of spiral contact springs disposed in the contacts and in the contact housing, the contact springs effecting the requisite electrical connections between the moving contact member, the first fixed contact, the contact housing, and the grounding contact. Preferably, two spiral spring contacts are disposed on each of the contacts.

In accordance with again another feature of the invention, the assembly includes a supporting section carrying the contact housing and forming a T-shape therewith, wherein a transverse stem of the T-shape encloses a given angle (e.g. 60°) with the supporting section.

In accordance with a concomitant feature of the invention, the contact housing has free ends each carrying one of the spiral contact springs.

As noted, a first embodiment of the invention has the thrust contact driven by a gear train whose pinion is disposed in the contact housing and which meshes with a toothed rack rod section on the thrust contact.

In a second embodiment of the invention, the moving contact member is driven by a threaded spindle which is caused to rotate by a drive outside the encapsulation.

In this case, the moving contact member may be hollow and may have in the interior a drive element with an internal thread in which the threaded spindle engages. In this case, the moving contact member must be prevented from turning when the threaded spindle is turned.

Other features which are considered as characteristic for the invention are set forth in the appended claims.

Although the invention is illustrated and described herein as embodied in a disconnecting/grounding switch for metal-encapsulated, gas-insulated high-voltage switchgear, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the follow-

BRIEF DESCRIPTION OF THE DRAWINGS

FIG. 3 a similar view of the embodiment of FIGS. 1 and 2 wit the moving contact member in a third position, disconnecting switch OFF, grounding switch ON;

DESCRIPTION OF THE PREFERRED EMBODIMENTS

Figure 1:
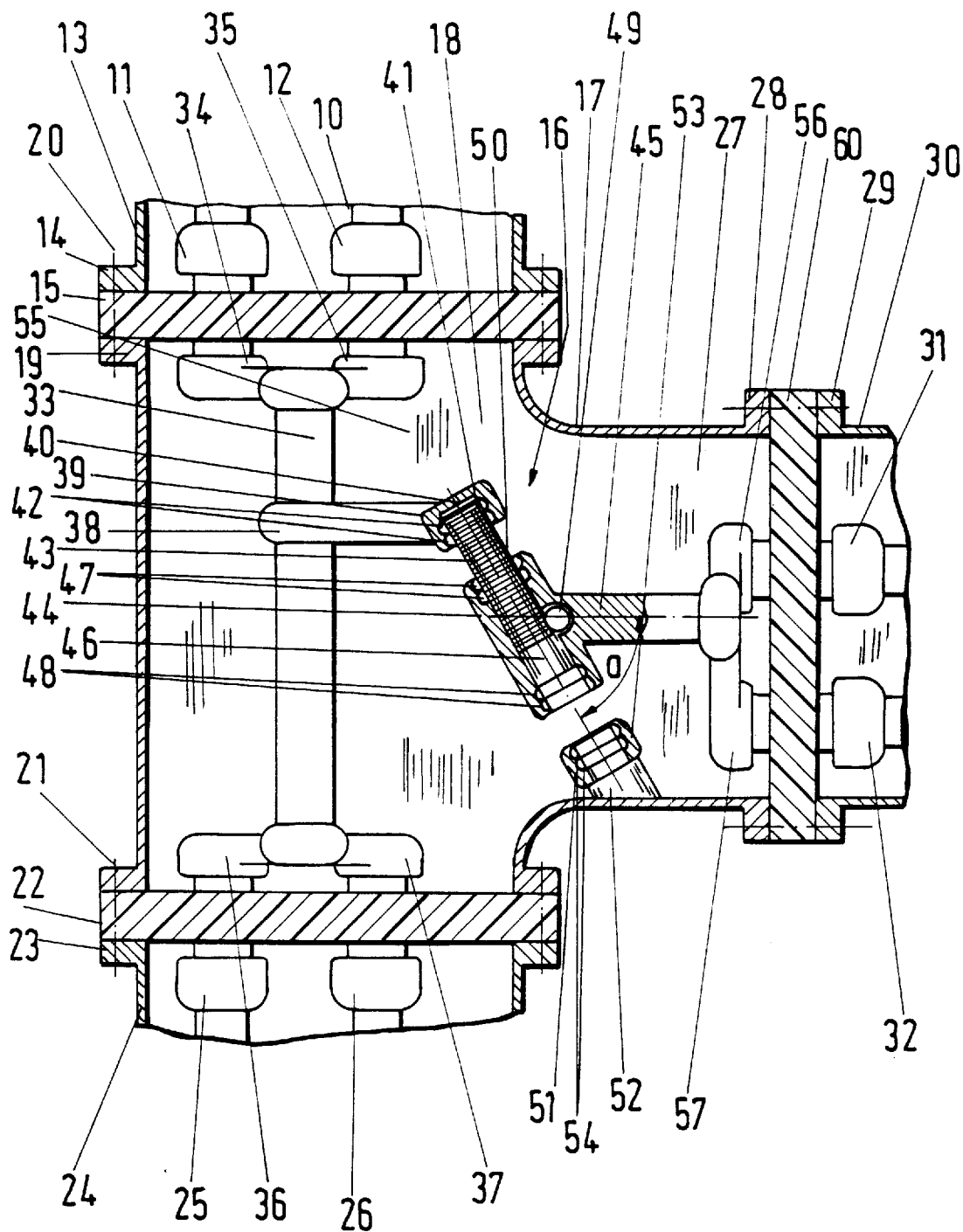
FIG. 1 is a longitudinal section of a first embodiment of the invention with the disconnecting switch ON and the grounding switch in the OFF position.

Reference is now had to the figures of the drawing in which identical reference numerals are used for like parts throughout. Referring first particularly to FIG. 1 of the drawing, an element of electrical high-voltage switchgear has a first line path 10 which has a number of phase conductors or inner conductors 11, 12 corresponding to the number of phases, and has a metal encapsulation 13 which has an end flange 14 on which a separation (compartmentalization) insulator 15 is mounted. This separation insulator 15 is at the same time also used for the phase or inner conductors 11 and 12 to pass through. As will be described in more detail further below, this separating insulator is adjacent to a disconnecting and grounding switch 16 which has a housing 17 with a T-shape. One end of the transverse bar 18 has a flange 19, which corresponds to the flange 14 and is connected to the flange 14 and to the insulator 15 by means of a screw connection 20. The other end of the transverse beam 18 likewise has a flange 21, to which an insulator 22, corresponding to the insulator 15, is connected. The insulator 22 is adjacent to a mating flange 23 on a metal encapsulation 24 which corresponds to the metal encapsulation 13 and which surrounds phase conductors 25 and 26 corresponding to the phase conductors 11 and 12. The phase conductors 11, 25; 12 and 26 are aligned with one another, in the same way as the center axis of the metal encapsulation.

A stem 27 of the T-shape runs at right angles to the transverse bar 18, and the free end of the housing 17 has a flange 28 connected thereto. A flange 29 of a metal encapsulation 30 extending at right angles to the line path 10 is connected to the flange 28. The metal encapsulation 30 encloses phase conductors 31 and 32, which extend at right angles to the phase conductors 11, 12; 25, 26.

The phase conductors 11, 25; 12, 26 are electrically conductively connected to connecting conductors 33, which lie on a plane and are respectively connected to the inner conductors 11, 12 by means of mating elements 34, 35, and to the inner conductors 25, 26 by mating elements 36, 37.

Supports 38 are connected to the connecting conductors 33 and run at right angles to them, their free ends being fitted with a fixed contact 39. The latter is pot-shaped and has a base 40 and side walls 41, in whose inner surfaces spiral contact springs 42 are mounted.

In the position shown in FIG. 1, a moving contact member 43 in the form of a thrust contact or pusher contact engages in the contact 39 and is held, such that it can move, in a contact housing 44 which is supported on a support 45 and at the same time forms a T-shape with the latter. The transverse stem of the T-shape encloses an angle $\alpha$ with a center axis of the support 45. The contact 39 is accordingly likewise aligned such that the center axis of the side wall 41 is aligned with the center axis of the direction of movement of the contact member 43. The center axis thus also encloses the angle a with the support 45.

Pairs of spiral contact springs 47 and 48 are disposed on the inner surface of the hole 46 which passes through the housing 44. The pairs of spiral contact springs 47 and 48, which correspond to the spiral contact springs 42, are inserted at the ends of the hole 46, and the moving contact member in this case makes electrically conductive contact with the spiral contact springs 42, the spiral contact springs 47 and the spiral contact springs 48 (see FIG. 2).

A toothed rack rod or shaft 49 meshes with a threaded rod section 50 on the moving contact member. The moving contact member is a contact bolt mounted within the contact housing 44. The rod 49 extends at right angles to the support 45 and parallel to the plane defined by the connecting conductors 33.

A grounding contact 51 is mounted by means of a support 52 on the inner surface of the stem of the housing 17. The grounding contact 51 is aligned with the center axis of the direction of movement of the moving contact member 43 and it has, similarly to the contact 39, a cylindrical wall 53 in whose inner surface spiral contact springs 54 are mounted.

The interior 55 of the housing 17, like the interior of the metal encapsulation 13, 24 and 30, is filled with insulating gas, preferably $SF_6$ gas.

Mating elements 56, 57 are connected to the supports 45, similarly to the mating elements 34, 35; 36, 37. The mating elements 56, 57 are used for connecting the supports 45, which are associated with the individual phases, to the inner conductors 31, 32.

FIG. 1 shows the disconnecting/grounding switch in the connected position, in which the contact housing 44 is electrically conductively connected to the contact 39 via the moving contact member 43. Current then flows from the phase conductors 11, 25; 12, 26, via the closed disconnecting switch, to the phase conductors 31, 32.

By turning the toothed rack shaft 49, the moving contact member 43 can be pulled into the contact housing 44, so that the entire moving contact member 43 is in the hole 46. The length of the contact member 43 is in this case matched to the length of the contact housing 44.

Figure 2:
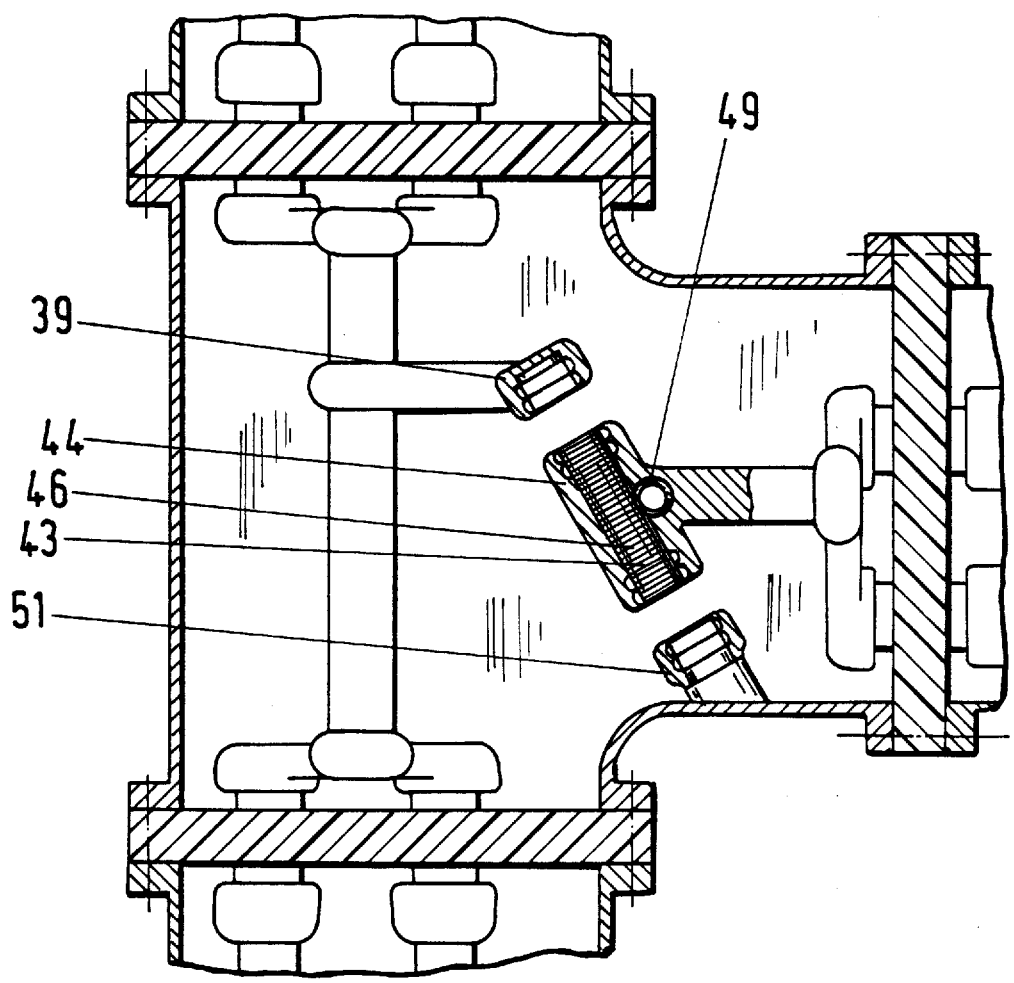
FIG. 2. is a similar view of the embodiment of FIG. 1, with the disconnecting switch OFF and the grounding switch in the OFF position.

FIG. 2 shows the disconnecting/grounding switch in the disconnecting switch OFF, grounding switch OFF position.

Figure 3:
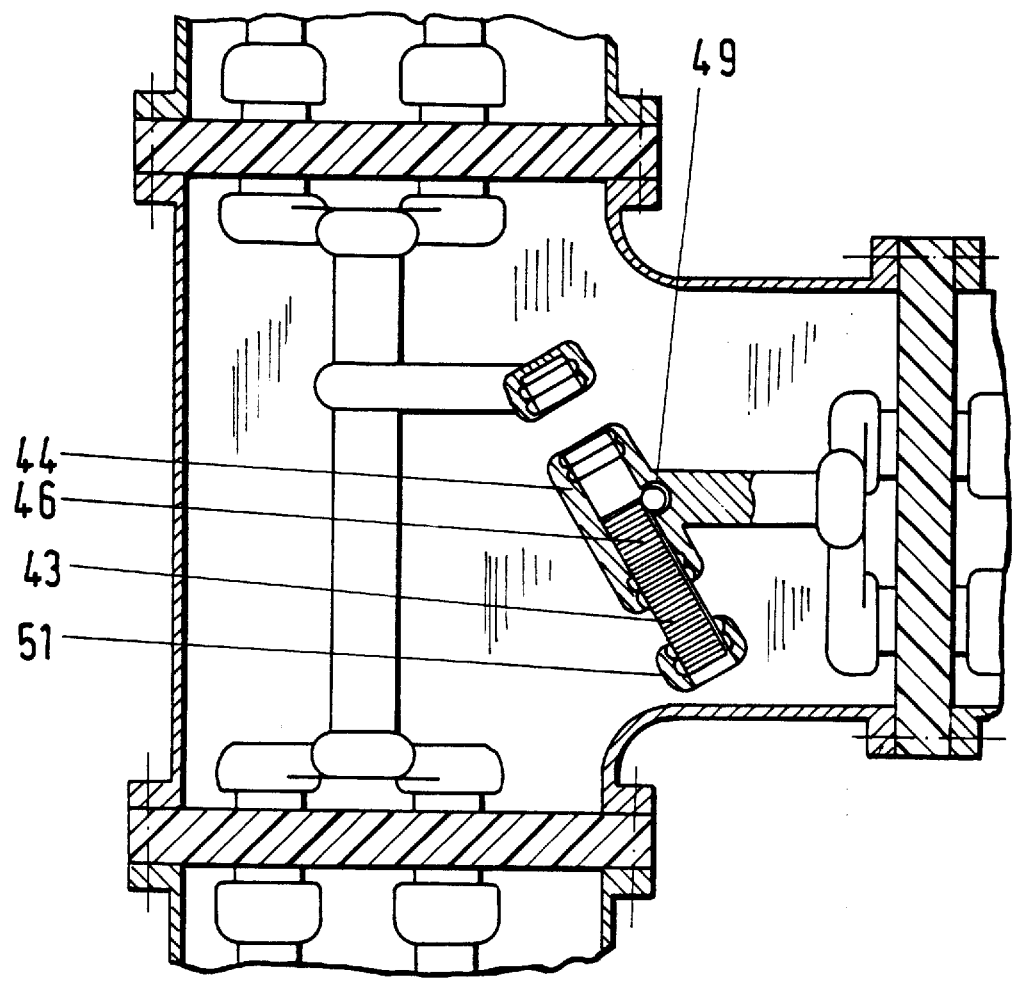

If the toothed rack shaft 49 is turned further, then the moving contact member 43 moves out of the contact housing 44 and into the grounding contact 51, see FIG. 3, so that the disconnecting switch is now disconnected, and the grounding switch is connected.

It should be added that an insulator 60 corresponding to the insulators 15, 22 is introduced between the flanges 28 and 29.

Figure 4:
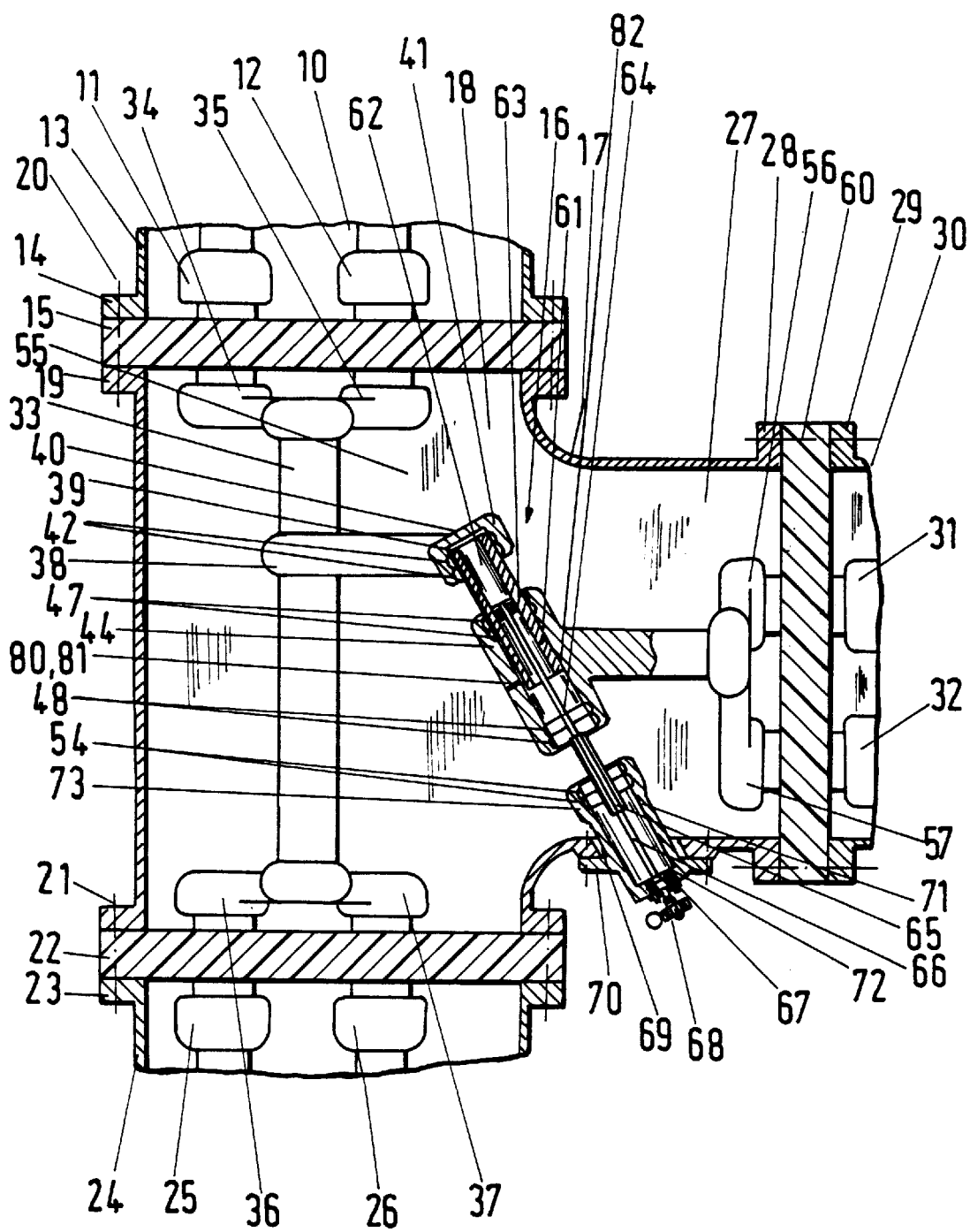
FIG. 4 is a longitudinal section of a second embodiment of the invention in the same switching position as FIG. 1.

Reference is now had to FIG. 4, in which most components are the same as the components in the configuration of FIG. 1, so that the same reference numbers are also used here.

The disconnecting/grounding switch is formed by a moving contact member 61 which has an inner hole 62 in which a fixing element 63 with an internal thread is mounted approximately in the center between the two ends of the moving contact member 61. A threaded spindle 64 is inserted into this internal thread and is firmly connected, with the interposition of an insulating rod 65, to a drive spindle 66 which is provided, via a gas-tight bushing 67, with a drive which is in this case designed as a worm drive 68 and causes the drive spindle 66 to rotate.

In the T-stem 27, the housing 17 has an aperture 69 which is closed by means of a flange 70 to which a cylindrical section 71 is connected, which is closed on the outside by a pot base 72 in which the rotary bushing 67 is mounted. The cylindrical section 71 projects inwards into the housing 17 and has an expanded region 73 at its free end, in which the spiral contact springs 54 are mounted. The expanded region 73 is thus used as an grounding contact, and the electrically conductive connection is made via the flange to the housing 17.

FIG. 4 shows the assembly in the disconnecting switch ON position, in which the moving contact member 61 engages in the interior of the cylindrical wall 41 and is electrically conductively connected to the spiral contact springs provided therein. It can be seen that, in the disconnecting switch ON position, the moving contact member 61 is connected to the spiral contact springs 47 of the contact housing 44.

The contact housing 44 has a radial opening 80, in which a guide block 81 is mounted which engages in a longitudinal groove 82 on the outer surface of the moving contact member 61; this prevents the moving contact member 61 from rotating when the drive spindle 66 and the threaded spindle 44 are caused to rotate.

Figure 5:
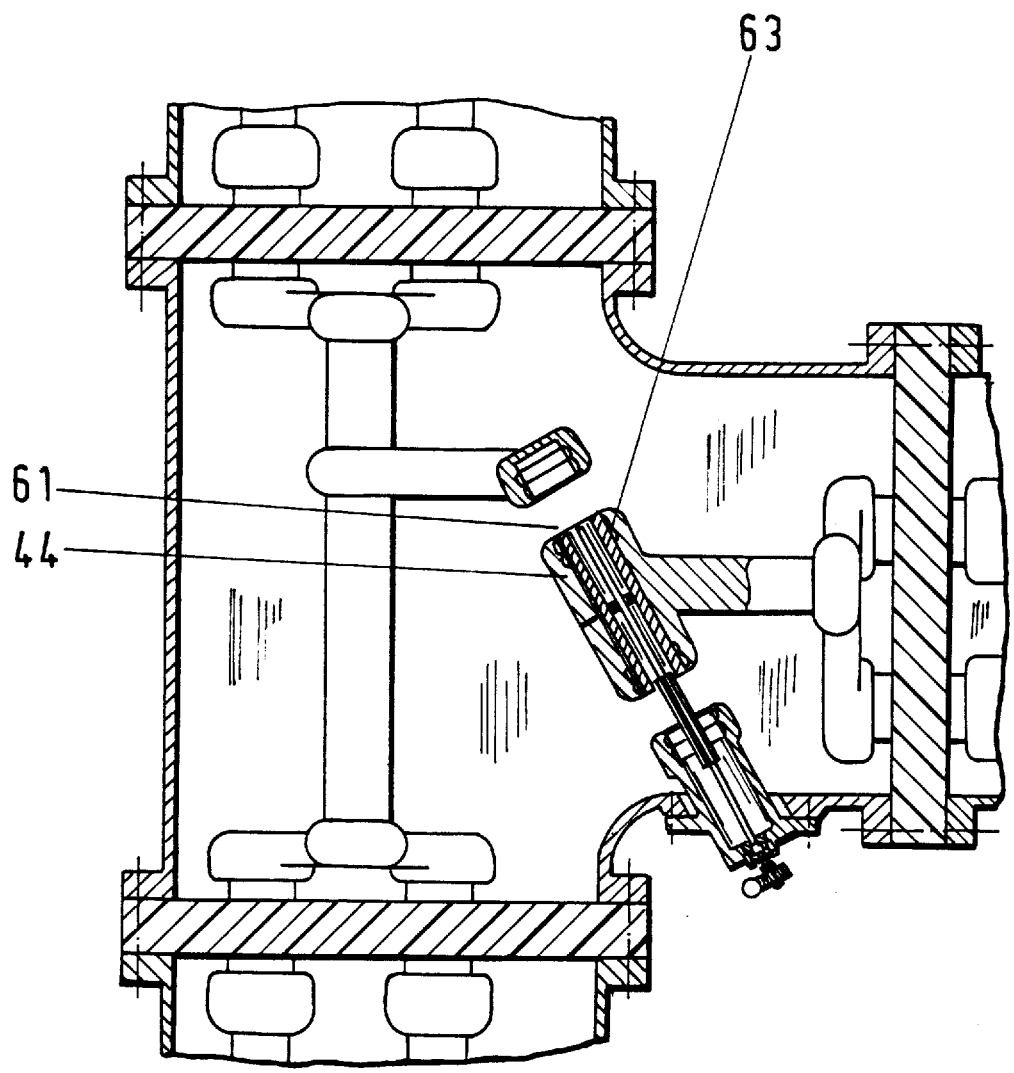
FIG. 5 is a view of the second embodiment corresponding to the view of FIG. 2.
Figure 6:
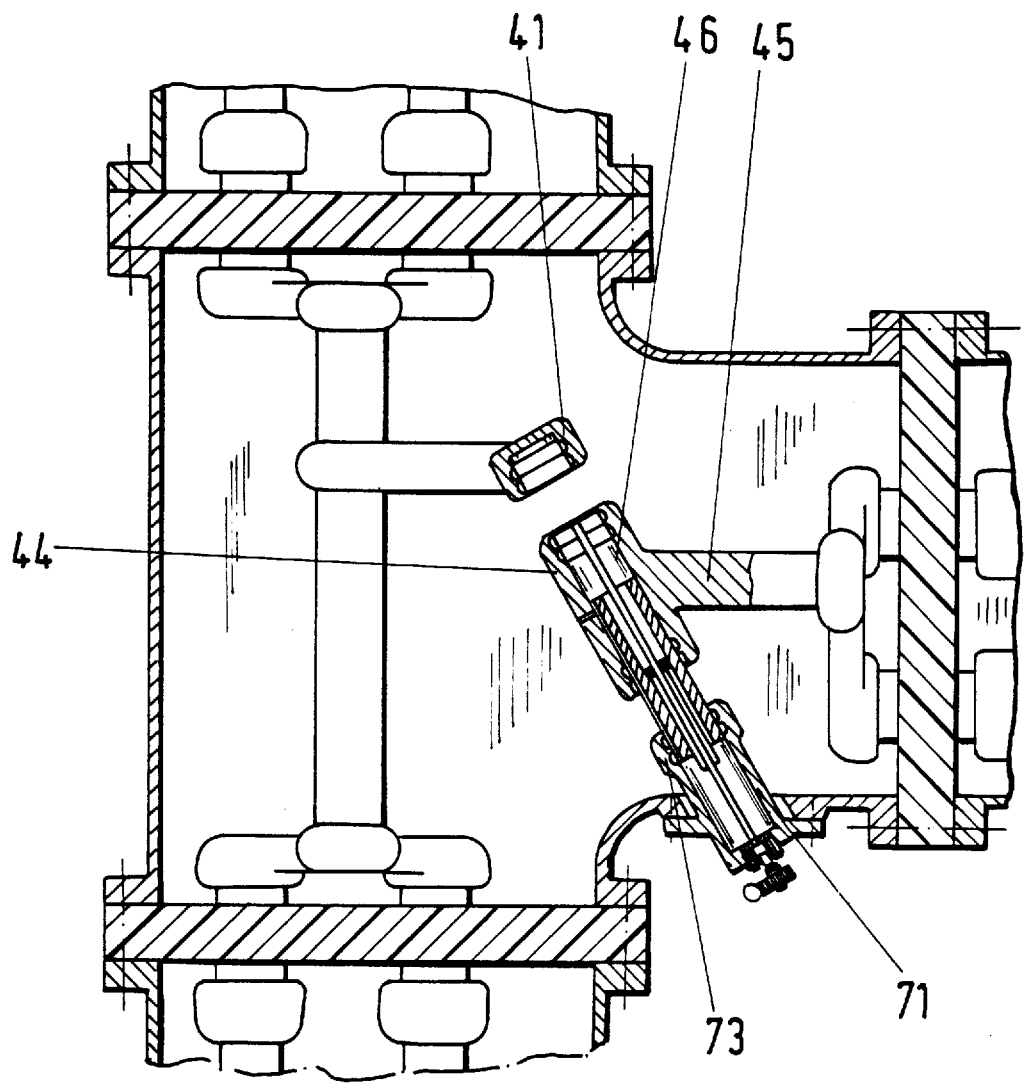
FIG. 6 is a view of the second embodiment corresponding to the view of FIG. 3.

As noted, FIG. 4 shows the assembly in the disconnecting switch ON position. By turning the drive spindle 66 and the threaded spindle 64, the moving contact member 61 can be moved via the internal threaded element 63 into the interior of the contact housing 44, so that the position according to FIG. 5 is reached, disconnecting switch OFF, grounding switch OFF. If the threaded spindle 64 is turned further, then the moving contact member 61 moves out of the contact housing 44 and engages in the interior of the expanded region 73, as a result of which the disconnecting switch OFF, grounding switch ON position is reached as shown in FIG. 6.

Finally, it should be noted that the center axis of the cylindrical wall 41, of the hole 46 in the contact housing 44 and the center axis of the expanded region 73 as well as of the cylindrical section 71 are aligned with one another. They enclose an angle α with the center axis of the supporting section 45. This angle is about 60° in the embodiment according to FIG. 1 and FIG. 4.

The spiral spring contacts are known per se and are located in grooves within the corresponding contacts. In the assembly according to FIGS. 1 and 4, they are each designed as pairs of spiral contact springs.

The toothed rack shaft 49 in the configuration according to FIG. 1 can additionally be connected to an insulating shaft, which is used as a drive shaft, and is driven from the outside.

The moving contact member in both versions according to FIGS. 1 and 4 is designed such that displacement or movement on the longitudinal axis allow only the disconnecting switch ON position or only the grounding switch ON position to be reached, which definitively precludes an incorrect switching operation such as disconnecting switch ON and grounding switch ON. Fitting the spiral spring contacts to both ends of the contact housing 44 allows the length of the moving contact member to be kept short, which makes it possible for a three-pole encapsulated disconnecting/grounding switch to have a compact structure.

We claim:

1. A disconnecting/grounding switch for metal-encapsulated, gas-insulated high-voltage switchgear, comprising:

a first inner conductor and a first fixed contact connected to said first inner conductor; a second inner conductor extending perpendicularly to said first inner conductor and a second fixed contact connected to said second inner conductor; a fixed grounding contact; a moving contact member in the form of a thrust contact movable between a first position in which said moving contact member connects said first and second fixed contacts and a second position in which said moving contact member connects said second fixed contact to said grounding contact;

a contact housing forming said second fixed contact, said moving contact member being disposed in said contact housing and being linearly movable therein along a movement path extending at a given angle relative to said first and second inner conductors;

each of said first and second fixed contacts and said grounding contact having a center axis, wherein said center axes of said fixed contacts and of said grounding contact, and the movement path of said moving contact member are aligned with one another.

2. The switch according to claim 1, wherein said thrust contact is formed with a toothed segment, and including a gear train meshingly driving said thrust contact, said gear train comprising a pinion disposed in said contact housing and meshing with said toothed segment on said thrust contact.

3. The switch according to claim 1, wherein said first fixed contact, said second fixed contact, said contact housing, and said moving contact member are disposed within a sealed encapsulation, and including a threaded spindle driving said moving contact member, and a drive disposed outside said sealed encapsulation rotatingly driving said threaded spindle.

4. The switch according to claim 3, wherein said moving contact member is hollow defining an interior space, and including a drive element disposed in said interior space, said drive element being formed with an internal thread in which said threaded spindle engages, said moving contact member being prevented from turning when said threaded spindle is turned.

5. The switch according to claim 3, wherein said encapsulation is a metal encapsulation having an opening formed therein, and including a cylindrical section having an external base, a drive spindle passing through said external base and being connected to said threaded spindle via an insulating bolt, and said cylindrical section carrying said grounding contact.

6. The switch according to claim 1, wherein said first fixed contact and said grounding contact are formed with a cylindrical wall into which said moving contact member is inserted.

7. The switch according claim 1, including a plurality of spiral contact springs disposed in said first fixed and grounding contacts and in said contact housing, said contact springs effecting electrically conductive connections between said moving contact member, said first fixed contact, said contact housing, and said grounding contact.

8. The switch according to claim 7, wherein two of said spiral contact springs are disposed on each of said first fixed and grounding contacts.

9. The switch according to claim 7, wherein said contact housing has free ends each carrying one of said spiral contact springs.

10. The switch according to claim 1, which further comprises a supporting section carrying said contact housing and forming a T-shape therewith, wherein a transverse stem of the T-shape encloses a given angle with said supporting section.

11. The switch according to claim 10, wherein said given angle is approximately 60°.

* * * * *

US005828025C1

(12) EX PARTE REEXAMINATION CERTIFICATE (20th)
Ex Parte Reexamination Ordered under 35 U.S.C. 257

United States Patent
Neumaier et al.

(10) Number: US 5,828,025 C1
(45) Certificate Issued: Jan. 29, 2015

(54) DISCONNECTING/GROUNDING SWITCH FOR METAL-ENCAPSULATED, GAS-INSULATED HIGH-VOLTAGE SWITCHGEAR

(75) Inventors: Heinrich Neumaier, Hausach (DE); Volker Thomas, Hanau (DE)

(73) Assignee: ABB Technology Ltd., Zurich (CH)

Supplemental Examination Request:
No. 96/000,066, May 19, 2014

Reexamination Certificate for:
Patent No.: 5,828,025
Issued: Oct. 27, 1998
Appl. No.: 08/910,650
Filed: Aug. 13, 1997

(30) Foreign Application Priority Data

Aug. 13, 1996 (DE) .................. 196 32 574

(51) Int. Cl.
*H01H 31/00* (2006.01)
*H02B 13/035* (2006.01)
*H01H 3/40* (2006.01)
*H01H 3/32* (2006.01)

(52) U.S. Cl.
USPC .............................. 218/79; 218/80

(58) Field of Classification Search
None
See application file for complete search history.

(56) References Cited

To view the complete listing of prior art documents cited during the supplemental examination proceeding and the resulting reexamination proceeding for Control Number 96/000,066, please refer to the USPTO's public Patent Application Information Retrieval (PAIR) system under the Display References tab.

*Primary Examiner* — Christina Y Leung

(57) ABSTRACT

A disconnecting/grounding switch for metal-encapsulated, gas-insulated high-voltage switchgear. A first fixed contact is connected to a first inner conductor. A second contact is connected to an inner conductor running at right angles to the first inner conductor. A moving contact member connects the two fixed contacts in one position and connects the second fixed contact with a fixed grounding contact in a second position. The moving contact member is a thrust contact whose path of motion runs at an angle to the first and second inner conductors and which can move linearly in a contact housing that forms the second contact. The two fixed contacts and the grounding contact are in a line. In a first position, the moving contact member can connect the first fixed contact to the contact housing; in a second position, it is located inside the contact housing, and in a third position, it connects the contact housing to the grounding contact.

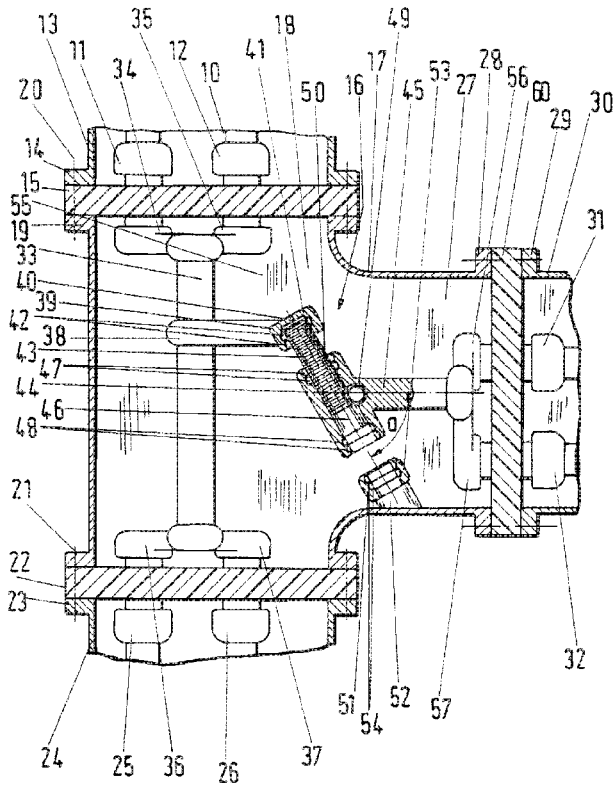

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claim 1 is confirmed.

Claims 2-11 were not reexamined.

* * * * *